A. Van Valkenburgh
Horseshoe.
Nº 28,218.   Patented May 8, 1860.
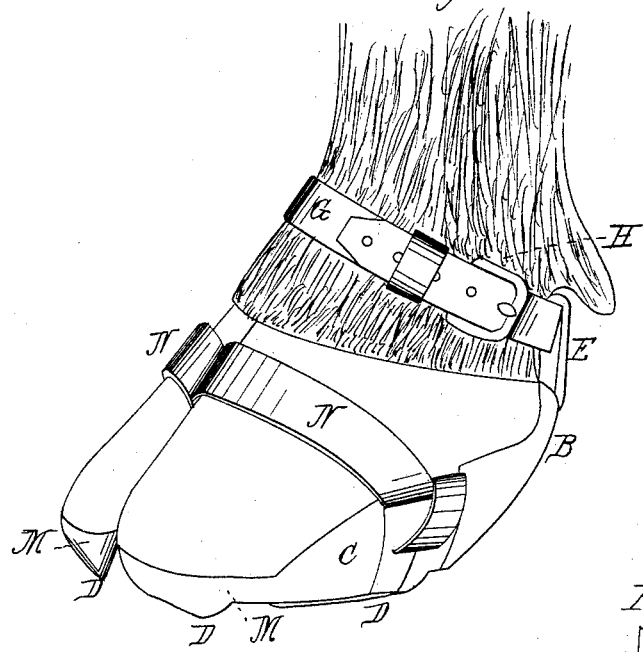
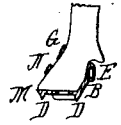
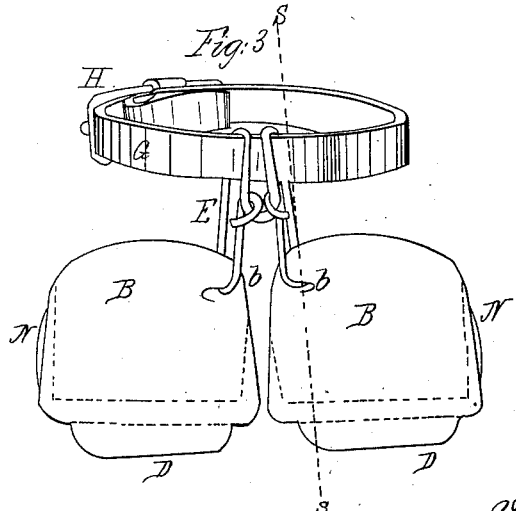
Witnesses:
Isaac Avery
Siebell Peck
Inventor:
Aby Van Valkenburgh

UNITED STATES PATENT OFFICE.

ALEXANDER VAN VALKENBURGH, OF GRIFFIN'S CORNERS, NEW YORK.

IMPROVEMENT IN OX-SHOES.

Specification forming part of Letters Patent No. 28,218, dated May 8, 1860.

*To all whom it may concern:*

Be it known that I, ALEXANDER VAN VALKENBURGH, of Griffin's Corners, in the county of Delaware and State of New York, have invented a certain new and Improved Ox-Shoe, which can be attached and detached at pleasure; and I do hereby declare that the following is a full and exact description of the same, reference being had to the accompanying drawings, and to the letters of reference marked thereon.

The shoeing of oxen by nailing in the ordinary manner requires considerable skill, and in many sparsely-settled districts much time is lost and much expense incurred in keeping the animals properly shod. Much trouble is also occasioned by the necessity of confining the foot of the animal while undergoing the process, and the nails not only damage the hoof, but are more or less liable, even in the most skilled hands, to enter some sensitive portion.

My invention is a substitute for the ordinary nailed shoe, and can be applied and removed by any farmer or teamster of ordinary intelligence.

The nature of my invention consists in providing for each part of the hoof a sole-plate with an inclined heel-flange, and fitted with a strap extending over the fore part of the hoof, so as, in combination with the inclined heel-flange and a slight suspending link secured thereon, to firmly bind it when the suspending heel-link is secured, and to allow its ready displacement and removal by a proper force when this link is released.

The nature of my invention also consists in uniting and suspending the shells or shoes for the two parts of a hoof by a double link, which, while it suspends the heels of both shells and holds them together, allows sufficient play of the parts independently one of the other.

To enable others skilled in the art to make and use my invention, I will proceed to describe its construction and operation by the aid of the accompanying drawings, in which—

Figure 1 is a perspective view of my improved shoe on the foot of the animal. Fig. 2 is a section on a smaller scale on the line S S in Fig. 3, and Fig. 3 is a rear view of the shoe removed.

Similar letters of reference indicate like parts in all the drawings.

M M are soles or shells of malleable cast-iron or other suitable metal, respectively, adapted to the two parts of the hoof. An inclined flange, B, is cast thereon at the heel, extending upward nearly as high as the hoof. Vertical portions or wings C of this flange extend a little distance along the sides of the soles M M. These soles have projections or corks D cast thereon to prevent the animal from slipping.

To the side flanges, C, I attach the ends of a strip of metal, N, which strip stands over the toe or claw and holds the shoe in place.

Through suitable holes, b, in the heel-flange B, I pass a stout steel wire, E, bent as represented, so as to form a double link, which holds the two portions or shoes together, allowing a sufficient motion to accommodate the natural working of the two parts of the hoof. Through this link, which is of sufficient length for that purpose, I pass a strap, G, around the limb just beneath the dew-claw, and secure this strap by the buckle H. The wire E, I term the "suspending link," as it holds the shells to their places by preventing the heels of either from dropping down, and as the hoof is embraced tightly by the strap N, under which it is forced by the weight of the animal acting against the inclined heel-flange B, the shoe is very firmly secured and cannot be removed without first removing the strap G. On unbuckling G and applying a slight force or sharp blow to the heel-flange B the whole is readily released.

These shoes are so easily attached and detached that the necessity for traveling to a blacksmith is entirely obviated by their use.

I have tested them on a number of oxen, and find that the proportions indicated in the drawings are entirely successful in practice with hard-working animals, and that the teamster simply requires a stock of these shoes to operate without delay or interruption under all ordinary circumstances.

In many localities cattle can be advantageously worked without shoes a large portion of the time. In such cases my invention can be readily attached when the road is slippery or when from any other cause it is needed. If the strap E incommodes the animal at first, the skin soon becomes hardened and causes no further inconvenience.

Having now fully described my invention, what I claim as new therein, and desire to secure by Letters Patent, is—

1. The strapped shell M N, with its inclined heel-flange B and a supporting heel-link, combined and arranged to form an ox-shoe possessing the qualities herein described.

2. Uniting and sustaining the two strapped shells M N M N by the double link E and strap and buckle G H or their equivalents, substantially in the manner herein set forth.

ALEX. VAN VALKENBURGH.

Witnesses:
 ISAAC AVERY,
 JEHIEL PECK.